(12) United States Patent
Scholz et al.

(10) Patent No.: US 11,734,270 B2
(45) Date of Patent: *Aug. 22, 2023

(54) OPTIMAL INDEX SELECTION IN POLYNOMIAL TIME

(71) Applicant: Oracle International Corporation, Redwood Shores, CA (US)

(72) Inventors: Bernhard F. Scholz, Sydney (AU); Pavle Subotic, Sydeny (AU)

(73) Assignee: Oracle International Corporatiton, Redwood Shores, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/473,815

(22) Filed: Sep. 13, 2021

(65) Prior Publication Data

US 2022/0035811 A1 Feb. 3, 2022

Related U.S. Application Data

(63) Continuation of application No. 14/959,722, filed on Dec. 4, 2015, now Pat. No. 11,120,020.

(51) Int. Cl.
*G06F 16/24* (2019.01)
*G06F 16/2453* (2019.01)

(52) U.S. Cl.
CPC .. *G06F 16/24537* (2019.01); *G06F 16/24534* (2019.01)

(58) Field of Classification Search
CPC .............. G06F 16/24537; G06F 16/24534
USPC ........................................................ 707/714
See application file for complete search history.

(56) References Cited

U.S. PATENT DOCUMENTS

2003/0120682 A1* 6/2003 Bestgen ............ G06F 16/24526

OTHER PUBLICATIONS

Gundem,T.I.,"NearOptimalMultipleChoiceIndexSelectionforRelational Databases",ComputerEngineering partment, BogaziciUniversity,Istanbul,Turkey;Sep. 1997(10pages). (Year: 1997).*
"Near Optimal Multiple Choice Index Selection for Relational Databases" by T. I. Gundem; Oct. 1997.*
Comer, D., "The difficulty of Optimum Index Selection", Computer Sciences Department, Purdue University, Sep. 1977 (12 pages).

(Continued)

*Primary Examiner* — Hosain T Alam
*Assistant Examiner* — Tracy M McGhee
(74) *Attorney, Agent, or Firm* — Ferguson Braswell Fraser Kubasta PC (57) ABSTRACT

A method may use a minimal set of indices for an input query including identifying the input query including primitive searches that are accelerated using indices, and computing a minimal set of indices for the input query using a polynomial-time algorithm by constructing a bi-partite graph comprising a first and a second vertex set. The first and the second vertex set may be a set of searches in both partitions of the bi-partite graph. Each edge of the edge set may connect a vertex in the first vertex set and a vertex in the second vertex set. The method may further include identifying an edge set as a strict subset relation between at least two searches of the set of searches showing up in the first and second vertex set of the bi-partite graph, and performing relational data analysis using the minimal set of indices for input queries.

15 Claims, 9 Drawing Sheets

(56) References Cited

OTHER PUBLICATIONS

Gundem, T. I., "Near Optimal Multiple Choice Index Selection for Relational Databases", Computer Engineering Department, Bogazici University, Istanbul, Turkey; Sep. 1997 (10 pages).
Valentin, G. et al., "DB2 Advisor: an Optimizer Smart Enough to Recommend its own Indexes"; Proceedings of 16th International Conference on Data Engineering, Feb. 2000 (10 pages).
Chaudhuri, S. et al., "Self-Tuning Database Systems: a Decade of Progress"; Proceedings 33rd International Conference on very Large Data Bases, University of Vienna, Austria; Sep. 23-27, 2007 (12 pages).

* cited by examiner

Optimal Index
Selection Method
270

Data: Set of searches $\{S_1,\ldots,S_l\} \subseteq 2^A$ for a single Relation R
Result: Lexicographical orders $L_1,\ldots,L_k$ 1  $V \leftarrow \{S_1,\ldots,S_l\}$;
2  $E \leftarrow \{(x,y) \in V \times V \mid x \subset y\}$;
3  $E' \leftarrow \text{max-matching}(V,V,E)$;
4  $R \leftarrow \emptyset$;
5  forall the $S \in \{x \in V \mid \not\exists (x,y) \in E'\}$ do
6  $\quad L \leftarrow \varepsilon$;
7  $\quad C \leftarrow S$;
8  $\quad$ while $\exists C' : (C',C) \in E'$ do
9  $\quad\quad \{a_1,\ldots,a_k\} \leftarrow (S - S')$;
10 $\quad\quad L \leftarrow a_1 \prec \ldots \prec a_k \prec L$;
11 $\quad\quad C \leftarrow C'$;
12 $\quad$ end
13 $\quad \{a_1,\ldots,a_k\} \leftarrow C$;
14 $\quad L \leftarrow a_1 \prec \ldots \prec a_k \prec L$;
15 $\quad R \leftarrow R \cup \{L\}$;
16 end
17 return R

OPTIMAL INDEX SELECTION IN POLYNOMIAL TIME

CROSS-REFERENCE TO RELATED APPLICATION

The present application is a continuation application of and, thereby, claims benefit under 35 U.S.C. § 120 to U.S. patent application Ser. No. 14/959,722, entitled, "OPTIMAL INDEX SELECTION IN POLYNOMIAL TIME," filed on Dec. 4, 2015, having the same inventors, and incorporated herein by reference in its entirety.

BACKGROUND

The index selection problem in databases is a problem that received attention in the 1970s to mid-90s in the research community. The problem is ad-hoc and inherently non-deterministic polynomial-time ("NP") hard solutions have been found to solve the index selection problem either heuristically or the user of the database provides the indices, i.e., the selection is performed manually.

The execution of relational algebra queries requires indices as an auxiliary data-structure for improving the run-time of queries. However, computing and maintaining indices for relations is expensive. Hence, the question arises how to ensure that a minimal set of indices is used to perform a relational algebra query.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments of the invention relate to a method for performing analysis using a minimal set of indices for an input query including identifying the input query including primitive searches that are accelerated using indices, computing a minimal set of indices for the input query using a polynomial-time algorithm by constructing a bi-partite graph comprising a first and a second vertex set. The first and the second vertex set are a set of searches in both partitions of the bi-partite graph. Each edge of the edge set connects a vertex in the first vertex set and a vertex in the second vertex set. The method further includes identifying an edge set as a strict subset relation between at least two searches of the set of searches showing up in the first and second vertex set of the bi-partite graph, and performing relational data analysis using the minimal set of indices for input queries.

In general, in one aspect, one or more embodiments of the invention relate to a system for performing analysis using a minimal set of indices for an input query including a data repository storing software code, and a computer processor communicatively connected to the data repository and configured to execute instructions to identify the input query including primitive searches that are accelerated using indices, compute a minimal set of indices for the input query using a polynomial-time algorithm by constructing a bi-partite graph comprising a first and a second vertex set. The first and the second vertex set are a set of searches in both partitions of the bi-partite graph. Each edge of the edge set connects a vertex in the first vertex set and a vertex in the second vertex set. The computer processor is further configured to execute instructions to identify an edge set as a strict subset relation between at least two searches of the set of searches showing up in the first and second vertex set of the bi-partite graph, and perform relational data analysis using the minimal set of indices for input queries.

In general, in one aspect, one or more embodiments of the invention relate to a non-transitory computer readable medium including instructions that, when executed by a computer processor, perform a method for performing analysis using a minimal set of indices for an input query including identifying the input query including primitive searches that are accelerated using indices, computing a minimal set of indices for the input query using a polynomial-time algorithm by constructing a bi-partite graph comprising a first and a second vertex set. The first and the second vertex set are a set of searches in both partitions of the bi-partite graph. Each edge of the edge set connects a vertex in the first vertex set and a vertex in the second vertex set. The method further includes identifying an edge set as a strict subset relation between at least two searches of the set of searches showing up in the first and second vertex set of the bi-partite graph, and performing relational data analysis using the minimal set of indices for input queries.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method that optimally selects the minimal number of indices for a set of searches in polynomial time. Specifically, embodiments of the invention involve the implementation of high-performance computer systems, such as a Datalog compiler. For this compiler (or other computer systems that perform complex, large-scale relational data analysis) to work optimally, a requirement is to find indices automatically using the maximal index assumption, i.e., all searches are covered by at least one index to obtain maximal performance. However, the number of indices for the cover should be minimal to keeping memory consumption and runtime low. The method of one or more embodiments of the invention uses a combinatorial result (i.e. Dilworth's Theorem) and computes the smallest index set via a maximum matching problem and a translation.

In one or more embodiments of the invention, the method is based on the observation that searches form a partial order. The minimal number of chains that cover the partial order correspond to lexicographical orders used to construct indices. The minimal number of chains is computable by a maximum matching algorithm. A simple post-processing step converts the chains to lexicographical orders that are used to construct the indices.

In one or more embodiments of the invention, database systems that use balanced search trees for indices, establish the maximal index assumption, and have select indices automatically would have interest implementing this technique. There are numerous database systems that would benefit from one or more embodiments of the invention.

Nomenclature

| Symbol | Description |
| --- | --- |
| x,y,z | Attributes |
| A,B,R | Relations |
| σ | Search query |
| ρ | Range query |
| ⇁ | Sequence connector |
| S | Set of searches |
| n | Number of tuples |
| m | Number of attributes |
| k | Number of loops |
| l | Number of input relations |

In one or more embodiments of the invention, indices are used as an auxiliary data structure to improve run-time performance of the execution of queries. For large-scale relations however, the overheads associated with indices are very costly. Ideally, a minimal set of indices for an input query is calculated; however, a naive enumeration-based search is intractable exhibiting a complexity of $\mathcal{O}\{2^{m^m}\}$, where m is the number of attributes in a relation, and more effective methods of finding an optimal number of indices should be employed.

In one or more embodiments of the inventions, indices induce orders on tuples in relations so that queries can be performed efficiently using some notion of a balanced search tree, in which elements can be found in logarithmic time rather than linear time. To create an order among tuples in a relation, tuples are made comparable. Since a tuple may have several elements, an order is imposed by element-wise comparison using a permutation over a subset of attributes, i.e., if the first elements produce a tie, the second elements are used and so forth. This comparison is also known as a lexicographical order that can be used to abstract away the underlying implementation details of an index in accordance with one or more embodiments of the invention.

For every search in a query, an assumption is made that at least one index exists in accordance with one or more embodiments of the invention. This property is referred to as the Maximal Index Assumption. A set of searches that has the Maximal Index Assumption has the best possible query time, since every search is covered by at least one index, and is executed in log-linear time. While indices improve lookup efficiency, they come at the relatively high cost of having additional data-structures and memory usage. As a result, one would ultimately want to use the minimal amount of indices. A brute-force approach is essentially unviable to find an optimal, minimal set of indices. The quest, in one or more embodiments of the invention, is to find an optimal algorithm that exhibits a polynomial runtime.

As an example (which is referenced in detail in regard to FIGS. 4 and 5), selecting a minimal set of indices for searches is important for computer systems that perform complex, large-scale relational data analysis. In particular, a high-performance Datalog engine may be used for large-scale static program analyses with millions of variables, hundreds of relational attributes, and giga-tuples of data. Translating Datalog to relational algebra programs induces a high number of searches that can be executed by indices. The high number of searches stem from the variable bindings and existence checks in Datalog rules. Thus, finding the minimal number of indices is necessary for maintaining the performance of computer systems that perform complex, large-scale relational data analysis by ensuring low latencies.

In one or more embodiments of the invention, a solution is described to find a minimal set of indices for an input query, whose primitive searches are accelerated by indices. A primitive search has as a search predicate a conjunction of equalities over attributes. With primitive searches, simple value queries and equi-joins can be constructed. For primitive searches, an optimal, polynomial time algorithm can be constructed, for example, using Dilworth's Theorem. The effectiveness and efficiency of one or more techniques involves an in-memory computing machine that is able to process relations with billion entries in memory.

Figure 1A:
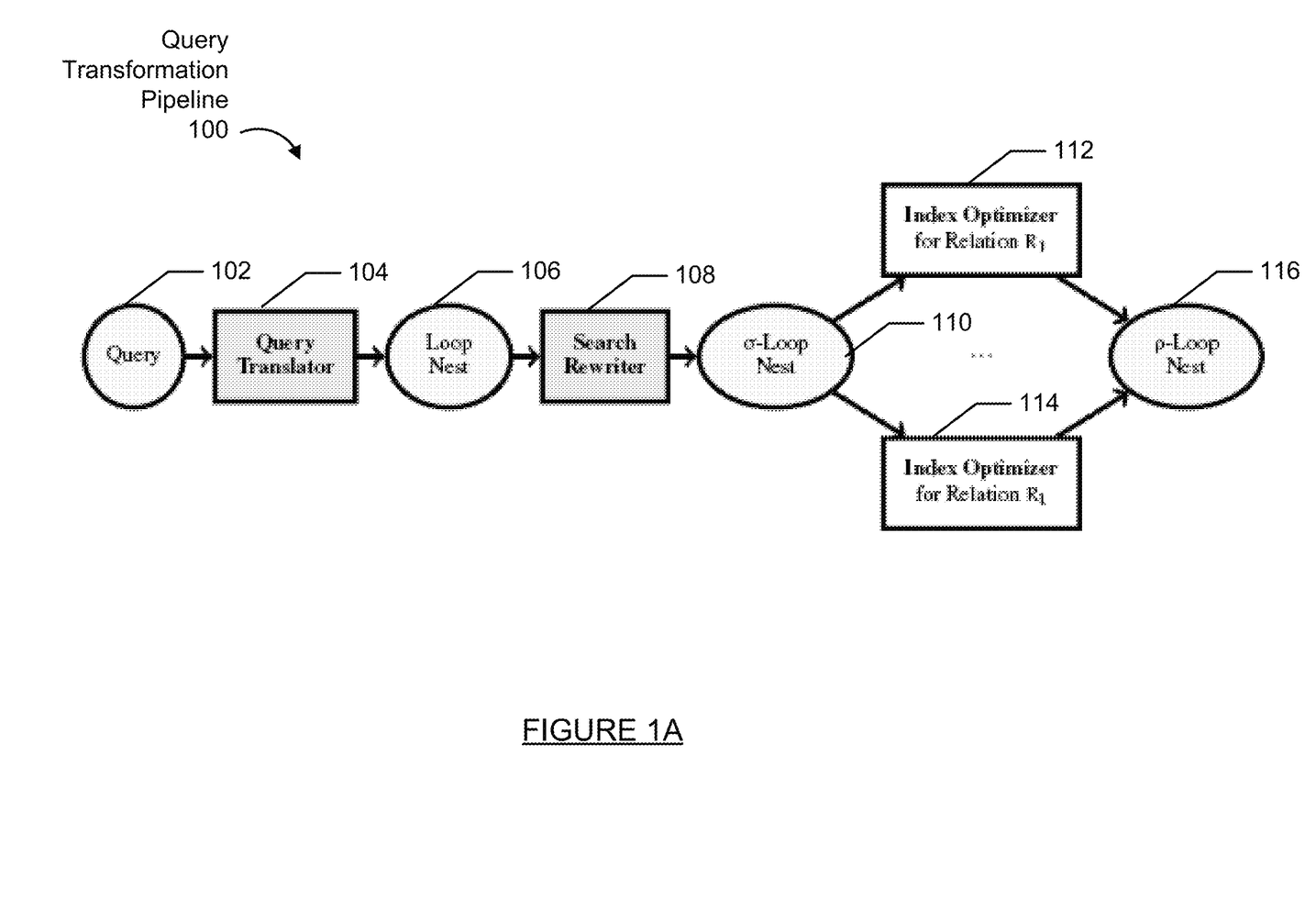
FIG. 1A shows a data flow chart in accordance with one or more embodiments of the invention.

In one or more embodiments of the invention, FIG. 1 shows a flow diagram of an approach to find optimal lexicographical orders in polynomial time. The approach is based on a query transformation pipeline (100). The approach assumes that queries for a relational database system are expressed in a domain specific language e.g., SQL and Datalog, whose underlying query semantics resembles a relational algebra system employing the usual set operators including product, projection, and selection on relations. An input query operates on a set of input relations $R_1 \ldots R_l$ and produces as a result an output relation R'. In one or more embodiments of the invention, the approach assumes a query optimization pipeline (100) as depicted in FIG. 1. In the first step (102), a query translator (104) converts an input query to a loop-nest (106) (also known as join loop-nest) in accordance with one or more embodiments of the invention. For sake of simplicity, the approach uses a single query; however the approach can be extended to a collection of queries, sub queries, etc. and the invention should not be limited by such a characterization.

In one or more embodiments of the invention, a loop-nest (106) represents an executable imperative program of the input query constructed by a collection of nested loops. Each loop in the loop-nest (106) enumerates tuples of a relation that occur in the input query, and filters tuples according to loop predicates. The loop body of the most inner loop projects the selected tuples of the loops to a new tuple that will be added to the output relation of the query if the tuple does not exist. In the pipeline (100), the loop-nest (106) is rewritten several times to obtain loop-nests containing index-operations denoted by the ρ-loop-nest (116).

In one or more embodiments of the invention, the second step in the query optimization pipeline (100) transforms the loop-nest (106) to a loop-nest with primitive searches, which is referred to as σ-loop-nest (110). In one or more embodiments of the invention, a primitive search filters tuples of an input relation R using a search predicate that is a conjunction of equality predicates over the attributes of the relation R. Moreover, in one or more embodiments of the invention, a primitive search selects a subset of tuples in relation R for which the search predicate $x_1=v_1 \wedge \ldots \wedge x_k=v_l$ holds. The values $v_1; \ldots; v_k$ of the search predicate can be either constants or tuple elements of outer loops. In a subsequent transformation step, a primitive search will be replaced by an index operation on relation R. Thus, a large number of primitive searches in the loop-nest will make the execution of the query more efficient. The rewriting of the loop-nest (106) to a σ-loop-nest. (110) is mainly a syntactical rewrite step. The σ-loop-nest. (110) enumerates tuples via the primitive searches, i.e., the original condition is broken up into a search predicate including a conjunction of equality predicates along with the remaining predicate.

In one or more embodiments of the invention, each search predicate is replaced by an index operation to reduce the loop-iteration space further.

The final step in the query transformation pipeline (100) converts the a e (110) to index operations also known as range queries. For the purpose of this approach, the indices are associated to a single relation only—therefore, the index optimization (112 and 114) is performed separately for each input relation. For a range query, a lexicographical order is required and the index optimizer (112 and 114) chooses the minimal number of lexicographical orders. Note that a physical implementation of an index by a lexicographical order over the tuples in a relation is abstracted. This abstraction is useful because an index optimization (112 and 114) can be described based on finding a lexicographical order (instead of arguing optimality based on a concrete implementation of an index). If appropriate lexicographical orders can be found for the input relations, all primitive searches can be replaced by range queries. The advantage of a range query is that the execution time of traversing the subset of the search query is performed in linear-log time in the size of the output of the primitive search, whereas a linear scan (i.e. enumerating all tuples and filtering them) has a runtime worst-case complexity of $\mathscr{O}(n)$. Hence, range queries are fundamental to reduce the iteration space of loop-nests (106). However, range queries are not free of costs—it is useful to have indices (i.e., lexicographical orders), that can service multitudes of primitive searches to amortize the cost of building and maintaining the indices.

Figure 1B:
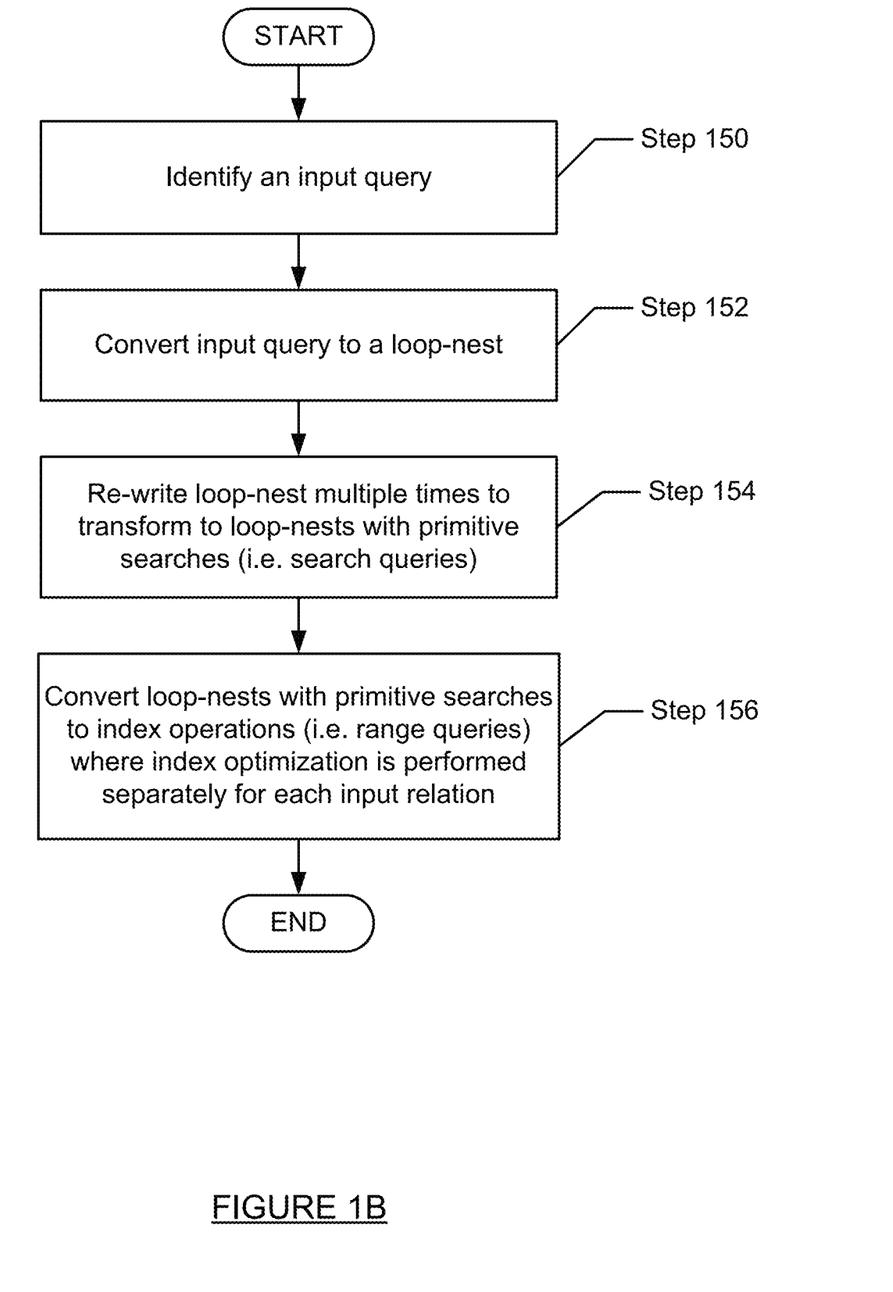
FIG. 1B shows a flow chart in accordance with one or more embodiments of the invention.

FIG. 1B shows a flow chart in accordance with one or more embodiments of the invention. In one or more embodiments of the invention, one or more of the steps described below may be omitted, repeated, and/or performed in a different order. Accordingly, the specific arrangement of steps shown in FIG. 1B should not be construed as limiting the scope of the invention.

Specifically, FIG. 1B shows a quick summary of the approach of the query transformation pipeline (100) of FIG. 1A involves at least four distinct steps in accordance with one or more embodiments of the invention. In Step 150, an input query is identified as discussed in detail above in relation to FIG. 1A. In Step 152, the input query is converted to a loop-nest as discussed in detail above in relation to FIG. 1A. Next, in Step 154, the loop-nest is rewritten multiple times to transform to loop-nests with primitive searches (i.e. search queries). Finally, loop-nests with primitive searches are converted to index operations (i.e. range queries) where index optimization is performed separately for each input relation (Step 156). In one or more embodiments of the invention, Steps 154 and 156 are performed in a manner discussed in detail above in relation to FIG. 1A.

In one or more embodiments of the invention, introduced here is a method that finds a minimal set of lexicographical orders for a set of searches, indirectly. The approach is centered around a combinatorial problem called the Dilworth's Theorem that Robert P. Dilworth introduced in 1950. Dilworth's Theorem is as follows: in a finite partial order, the size of a maximum anti-chain is equal to the minimum number of chains needed to cover its elements. As used in Dilworth's Theorem, an anti-chain is a subset of a partial ordered set such that any two elements in the subset are unrelated, and a chain is a totally ordered subset of a partial ordered set. Although Dilworth's Theorem is non-constructive, there are two algorithmic implementation of Dilworth's theorem, i.e., methods are introduced to compute the minimal number of chains to cover the elements of the partial order. The first constructive proof translates Dilworth's theorem to maximum matching problem in a bipartite graph and the second constructive proof translates the theorem to a max-flow problem making the minimal number of chains computable in polynomial time.

Finding lexicographical orders in polynomial time relies on the idea that lexicographical orders are not searched, directly. Instead, we use the notion of a chain of searches, and establish a relationship between a chain of searches and a lexicographical order. A chain of searches is a subset of totally ordered searches of a relation such that $S_1 \subset S_2 \subset \ldots \subset S_{p-1} \subset S_p$, i.e., the attributes of Si are contained in Si+1, for all i, $1 \le i < p$. Note that a lexicographical order that covers a set of searches, induces by definition a chain of searches, i.e., the searches can only be extended by attributes since the attributes of the searches have to be a prefixes. Conversely, a chain of searches $S_1 \subset S_2 \subset \ldots \subset S_{p-1} \subset S_p$ is converted to a sequence $S_1 < S_2 - S_1 < \ldots < S_p - S_{p-1}$ that covers the searches. Note if the sets S1 or the set differences Si+1−Si contain more than one element, the choice how to sequence the elements in them is arbitrary, since any of the selected sub-orders for the attribute elements will give a valid sequences to cover the searches in the chain.

Figure 2A:
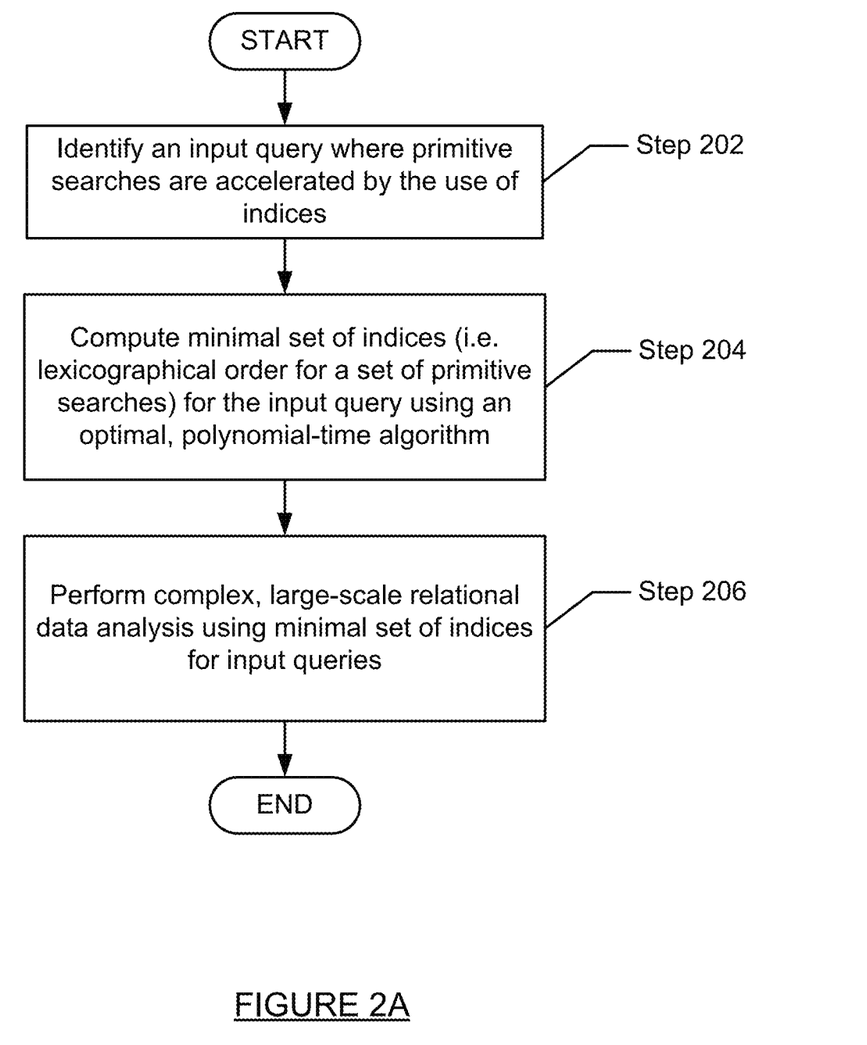
FIG. 2A shows a flow chart in accordance with one or more embodiments of the invention.
Figure 2B:
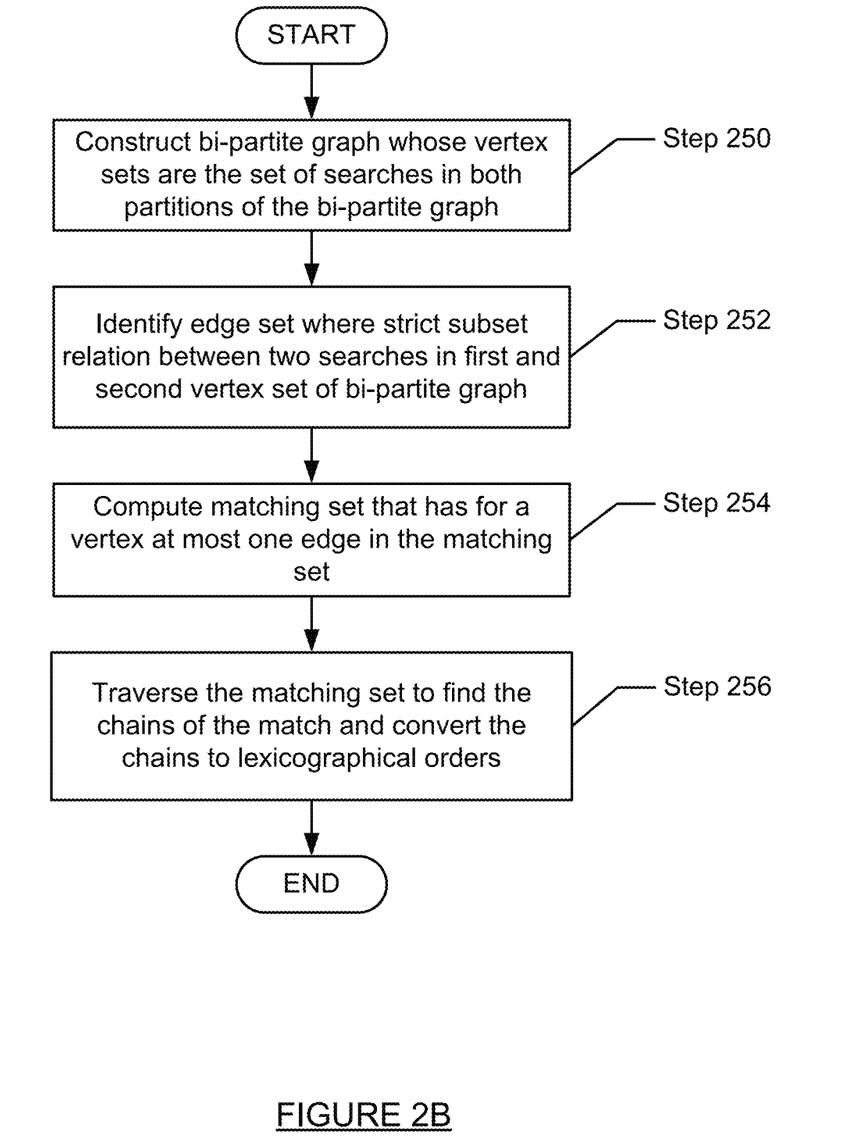
FIG. 2B shows a flow chart in accordance with one or more embodiments of the invention.

FIGS. 2A and 2B show a flow chart in accordance with one or more embodiments of the invention. In one or more embodiments of the invention, one or more of the steps described below may be omitted, repeated, and/or performed in a different order. Accordingly, the specific arrangement of steps shown in FIGS. 2A and 2B should not be construed as limiting the scope of the invention.

Specifically, FIGS. 2A and 2B show flowcharts depicting a method of addressing Minimal Index Selection Problem (MISP) by finding optimal lexicographical orders in polynomial time as elaborated upon in the Optimal Index Selection Method (270) shown in FIG. 2C following the use of Fulkerson's maximum matching reduction for Dilworth's Theorem shown in FIG. 3 and described below.

As shown in FIG. 2A, the method addressing Minimal Index Selection Problem (MISP) by finding optimal lexicographical orders in polynomial time begins, in Step 202, by identifying an input query where primitive searches are accelerated by the use of indices in accordance with one or more embodiments of the invention. Next, in Step 204, a minimal set of indices (i.e. lexicographical order for a set of primitive searches) is computed for the input query using an optimal, polynomial-time algorithm in accordance with one or more embodiments of the invention. Finally, in one or more embodiments of the invention, complex, large-scale relational data analysis is performed using minimal set of indices for input queries (Step 206).

Figure 2C:
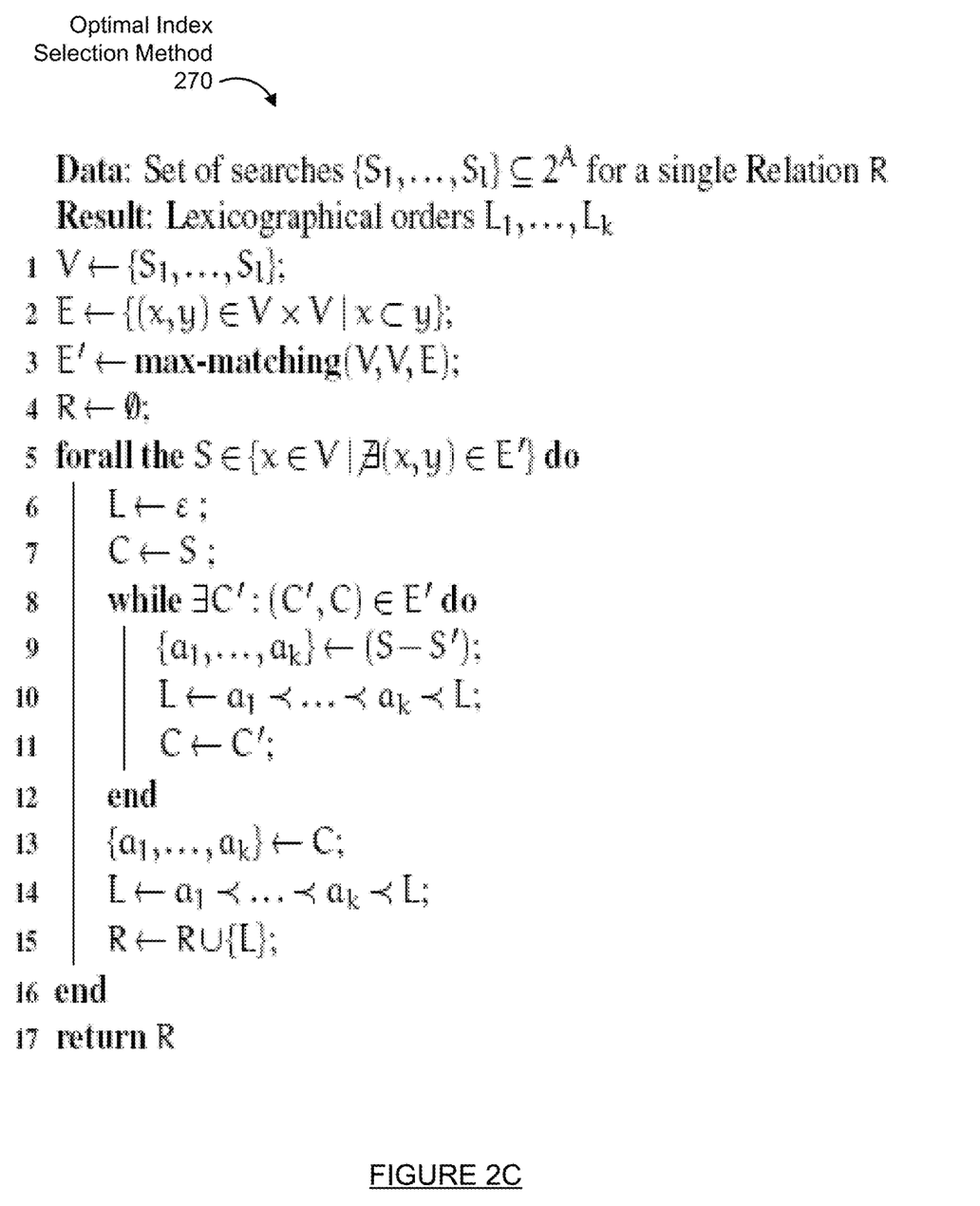
FIG. 2C shows sample pseudo-code of an optimal index selection method in accordance with one or more embodiments of the invention.

In one or more embodiments of the invention, in Step 250 of FIG. 2B, a bi-partite graph is constructed whose vertex sets are the set of searches in both partitions of the bi-partite graph (as shown in Line 1 of FIG. 2C). Second, in Step 252 of FIG. 2B, the edge set is the strict subset relation between two searches showing up in the first and second vertex set of the bi-partite graph (as shown in Line 2 of FIG. 2C) in accordance with one or more embodiments of the invention. Third, in Step 254 of FIG. 2B, the maximum matching algorithm computes the matching set E' that has for a vertex at most one edge in the matching set (as shown in Line 3 of FIG. 2C) in accordance with one or more embodiments of the invention. Fourth, in Step 256 of FIG. 2B, the result of the maximum matching algorithm is traversed to find the chains of the match and convert the chains to lexicographical orders (as shown in Lines 4-17 of FIG. 2C) in accordance with one or more embodiments of the invention. Specifically, the outer loop (as shown in Line 5 of FIG. 2C) identifies the largest element S of a chain, i.e., elements that do not have an incoming edge in the matching set in accordance with one or more embodiments of the invention. Beginning from the maximum element of the chain, the elements C of the chain are traversed by the inner loop (see Lines 8-12 of FIG. 2C). In the loop body of the inner loop the set difference is calculated and added to the sequence L. In Lines 13-14 of the Optimal Index Selection Method (270) shown in FIG. 2C, the smallest search is added to the lexicographical order and in Line 15 the newly formed sequence is added to the result set of sequences R.

Using the method shown in FIGS. 2A, 2B, and 2C, the minimal number of indices for primitive searches using the maximal index assumption is capable of calculation. Existing optimization model do not have the restriction to primitive searches or the maximal index assumption. Thus, this solution for the optimization problem has the benefit of not being NP hard and can be solved in polynomial time. In addition this method has the benefit of using the notion of subsumption, i.e., an index covers several primitive searches. This subsumption idea leads to the connection of Dilworth's minimal chain cover problem.

Figure 3:
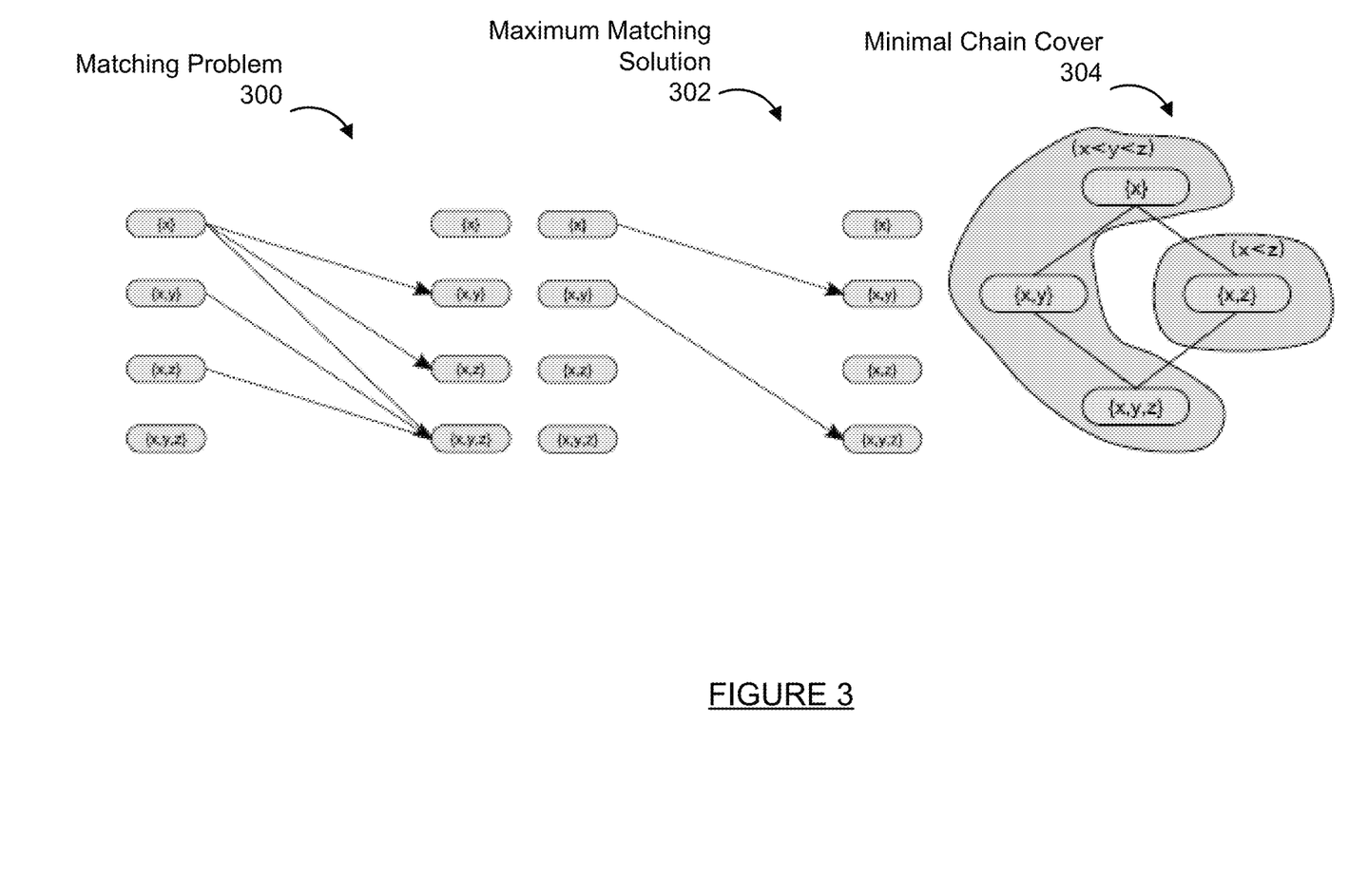
FIG. 3 shows diagrams in accordance with one or more embodiments of the invention.

FIG. 3 shows a motivating example of Fulkerson's Maximum Matching Reduction for Dilworth's Theorem in accordance with one or more embodiments of the invention. The partial ordered set is the set of searches {x}, {x,y}, {x,z}, and {x,y,z} of relation A shown as the matching problem (300). Bi-partite construction and the maximum matching problem solution (302) induce a minimal chain cover. The chains induce minimal number of indices nd shown as minimal chain cover (304).

The main motivation to construct the new index selection method shown in FIGS. 2A, 2B, 2C, and 3 was a new Datalog compiler that translated a Datalog program to optimized OpenMP/C++ code. For achieving high-performance, indices were required to accelerate the execution time of queries. An example of such a computing system is shown in FIG. 4 and described below.

Figure 4:
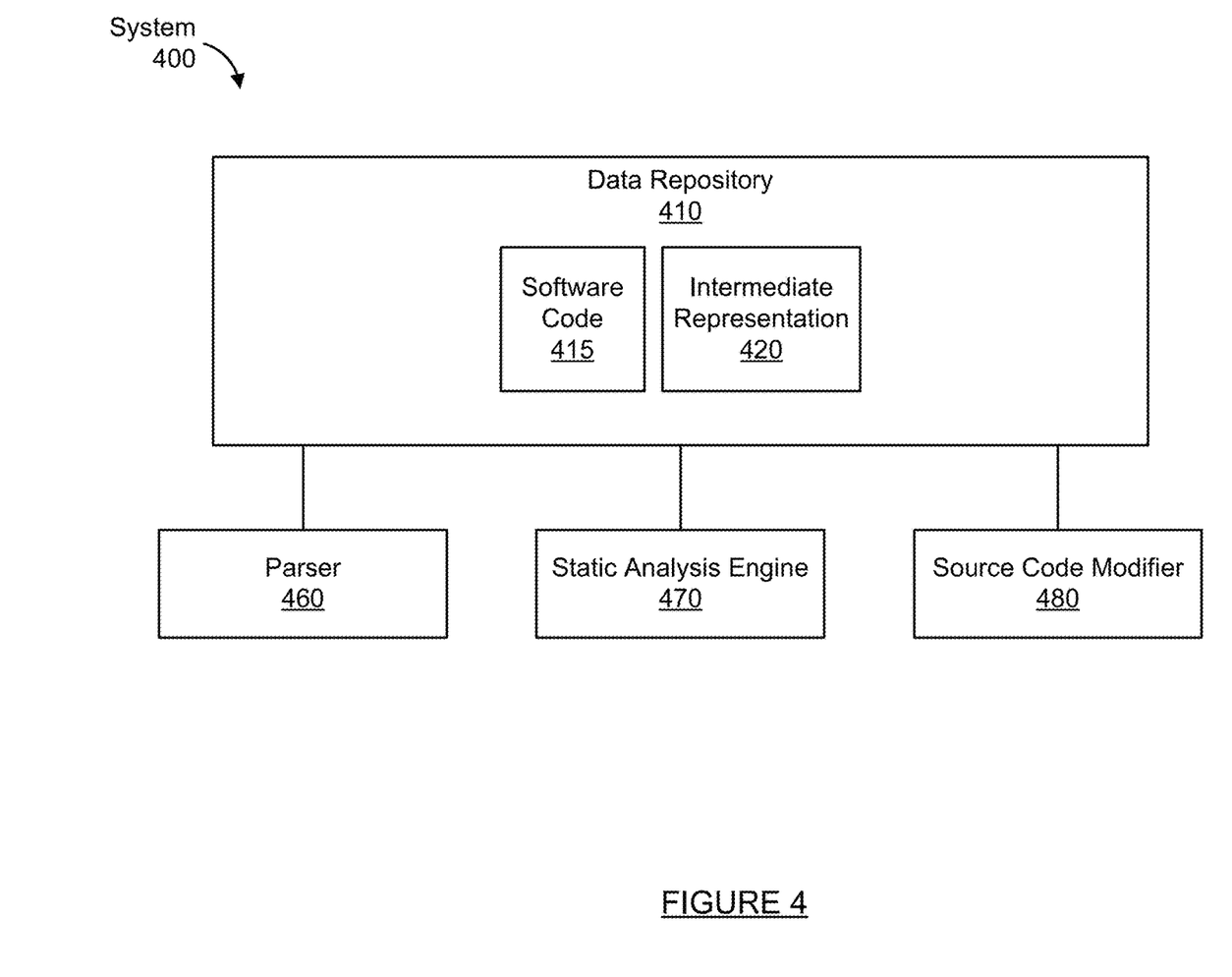
FIG. 4 shows a system diagram in accordance with one or more embodiments of the invention.

FIG. 4 shows a system (400) in accordance with one or more embodiments of the invention. As shown in FIG. 4, the system (400) includes a data repository (410), a parser (460), a static analysis engine (470), and a software code modifier (480). Each of these components are described below and may be located on the same device (e.g., a server, mainframe, desktop personal computer (PC), laptop, personal desktop assistant (PDA), television, cable box, satellite box, kiosk, telephone, mobile phone, or other computing devices) or may be located on separate devices coupled by a network (e.g., Internet, Intranet, Extranet, Local Area Network (LAN), Wide Area Network (WAN), or other network communication methods), with wire and/or wireless segments in a manner shown and described in relation to FIG. 4 below.

In one or more embodiments of the invention, the system (400) is implemented using a client-server topology. The system (400) itself may correspond to an enterprise application running on one or more servers, and in some embodiments could be a peer-to-peer system, or resident upon a single computing system. In addition, the system (400) is accessible from other machines using one or more interfaces (not shown). In one or more embodiments of the invention, the system (400) is accessible over a network connection (not shown), such as the Internet, by one or more users. Information and/or services provided by the system (400) may also be stored and accessed over the network connection.

In one or more embodiments of the invention, the data repository (410) corresponds to a data storage device that includes functionality to store software code (415), intermediate representation (420), and a data structure (430) (e.g., a rooted directed graph). In one or more embodiments of the invention, access to the data repository (410) is restricted and/or secured. As such, access to the data repository (410) may require authentication using passwords, secret questions, personal identification numbers (PINs), biometrics, and/or any other suitable authentication mechanism. Those skilled in the art will appreciate that elements or various portions of data stored in the data repository (410) may be distributed and stored in multiple data repositories. In one or more embodiments of the invention, the data repository (410) is flat, hierarchical, network based, relational, dimensional, object modeled, or structured otherwise. For example, the data repository may be maintained as a table of a SQL database. In addition, data in the data repository (410) may be verified against data stored in other repositories.

Continuing with FIG. 4, in one or more embodiments of the invention, the software code (415) in the data repository (410) may correspond to code written in a high level programming language, a low level programming language, byte code and/or any other suitable form. A statement within the software code (415) may correspond to simple statements, compound statements, declarations, or any other element in code. Errors within the statements may be exploited by external input (e.g., user input). For example, an input value that is used as an array index may be greater than the size of the array.

In one or more embodiments of the invention, the parser (460) corresponds to a program(s) that includes functionality to translate the software code (415) to an intermediate representation (420) prior to translation to the executable. Those skilled in the art will appreciate that the parser may be replaced with a compiler, which may include functionality to perform lexical analysis, preprocessing, parsing, semantic analysis, code generation, code optimization and/ or another suitable method to translate the software code (415). In one or more embodiments of the invention, a compiler may correspond to a low level virtual machine that avoids machine specific constraints, where every value or memory location has an associated type and all instructions obey strict type rules.

In one or more embodiments of the invention, the static analysis engine (470) corresponds to a process, program, and/or system that includes functionality to represent the software code (415), or an intermediate representation (420) of the software code (415).

In one or more embodiments of the invention, the source code modifier (480) includes functionality to the software code (415) reachable by user input. The source code modifier (480) may be used with an analysis of information to determine which portion of the code to modify. In one or more embodiments of the invention, the code modifier (480) may interact with a user interface (not shown) for identifying and/or modifying code. The user interface may be a web interface, a graphical user interface (GUI), a command line interface, an application interface or any other suitable interface. The interface may also include one or more web pages that can be accessed from a computer with a web browser and/or internet connection. Alternatively, the interface may be an application that resides on a computing system, such as a PC, mobile devices, a PDA, and/or other computing devices of the users, and that communicate with one or more components of the system (400) via one or more network connections and protocols.

Figure 5:
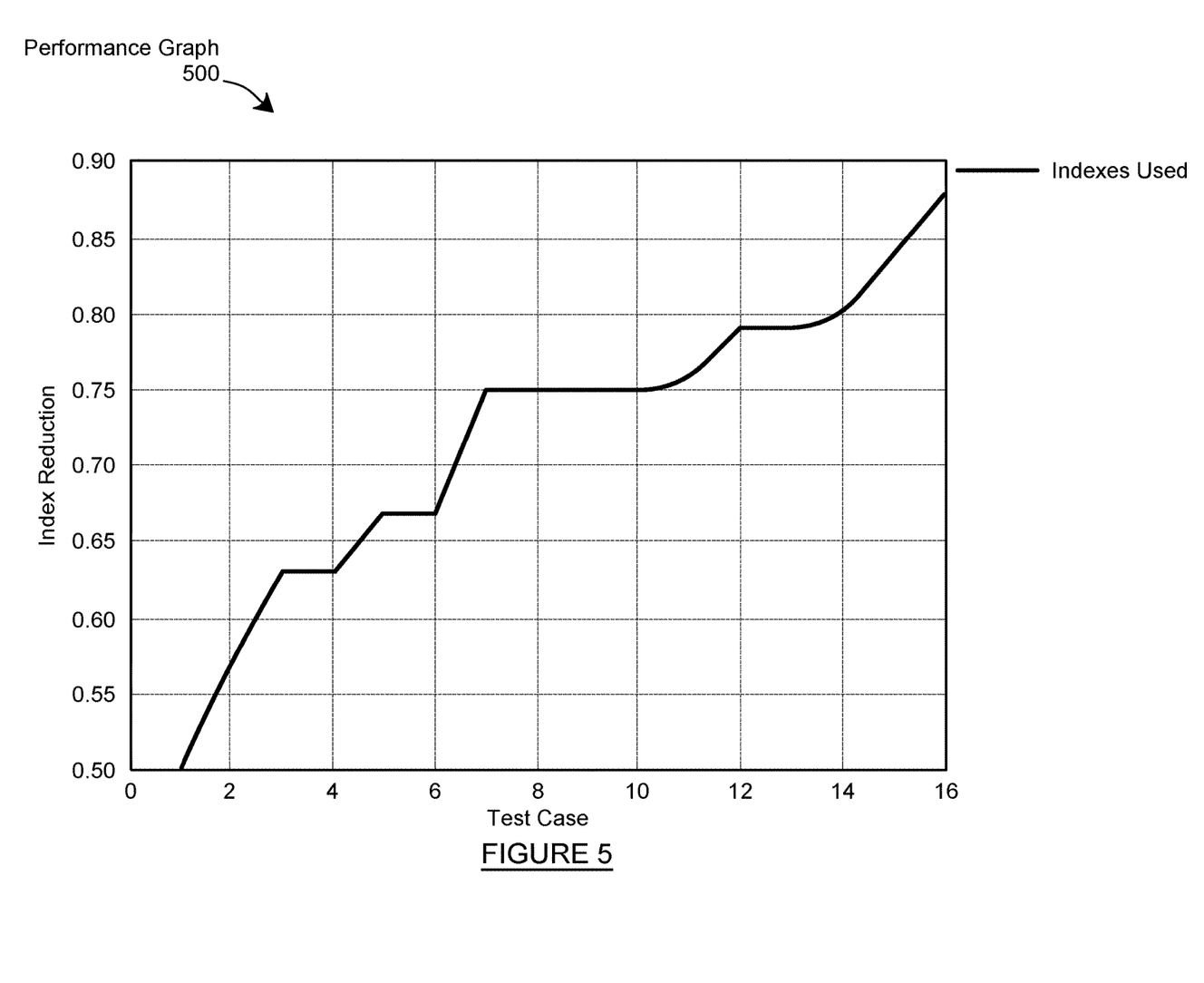
FIG. 5 shows a graph in accordance with one or more embodiments of the invention.

Turning to FIG. 5, in contrast to relational databases management system (RDBMS), Datalog requires specific attention to two issues that may be less prominent in RDBMS applications:

1. Datalog makes extensive use of equi-joins, which is a cross-product of tables whose result is filtered by equality predicates among the elements of the tuples. For example leg, z:-eg.xy, e (>M is translated to a cross product of the table edge with itself where two pairs in the relation edge are searched for whose the second element of the first pair is equal to the first element of the second pair.

2. Datalog enforces a set constraint on tables, i.e., no table must store a tuple twice. Therefore, a lookup is required for each insertion operation, to check whether the tuple already exists in the table. For large tables, this lookup is an expensive operation.

Both types of searches are covered by primitive searches and, therefore, the Datalog queries will have ample optimization potential using the technique described above and shown in FIGS. 2A, 2B, 2C, and 3.

FIG. 5 shows a performance graph (500) that depicts the reduction in indices with auto-index generation on arbitrary Datalog programs from a regression test suite in accordance with one or more embodiments of the invention. One can observe that even on arbitrary small programs, the auto-index generation generally improves the number of indices needed.

In particular, the experimental findings shown and described below indicate that the methodology in accordance with one or more embodiments of the invention, improve the performance of a computer. Specifically, using the Datalog-engine running on a 8 core Intel Xeon 3 GHZ, 25600 cache, 132 GB RAM, the experimental findings are summarized in Table 1 below. To produce the results a points-to static analyses was performed on relational representations of the Java Development Kits (JDK) versions 7 and 9 as well as the Java library source code.

TABLE 1

Experimental results with and without auto-selection

| Experiment | No Auto-Selection | | Auto-Selection | |
|---|---|---|---|---|
| | Run-time | Memory (gb) | Run-time | Memory (gb) |
| JDK7 CI | 16:30 m | 81.8 | 0:42 m | 10.3 |
| Java CS | * | * | 5 h :30 m | 18.9 |

Each experiment was performed using both a naive index assignment (No Auto-Selection) and the technique described above and shown in FIGS. 2A, 2B, 2C, and 3 (Auto-Selection). CI indicates a less precise context insensitive points-to analysis and CS indicates the more precise context sensitive points-to analysis. For the JDK7 and Java, the relation sizes can have up to giga-tuples of data with several relations containing hundreds of attributes.

As shown in Table 1, in all the experiments auto-index generation significantly improved both memory usage and run-time of the computer system. The JDK experiments resulted in a maximum memory reduction of 13% and a maximum speed up of 24%. The Java library experiment resulted in a timeout without auto-selection (i.e. was not capable of completion), while auto-selection generation enabled the Java library to be processed in five and a half hours with 18.9 gigabytes of memory usage. The memory improvement is due to minimizing redundant index data structures. The run-time performance is most likely attributable to index maintenance costs.

All indexes need to be constructed incrementally, given a large number n (approximately a billion) of tuples and 5 indices, requires 5n log(n) work. However, if reduced to only one index, then the work is reduced to n log(n).

TABLE 2

Comparison with Soufflé with the state-of-the-art, running a context-insensitive analysis on JDK7.

| | Run-time (m) | Memory (gb) |
|---|---|---|
| Soufflé | 0:42 | 10.3 |
| Bddbddb | ≈30:00 | 5.7 |

In Table 2, shown above, the approach used in one or more embodiments of the invention using the Soufflé engine with other state-of-the-art Datalog engines, such as Bddbddb. Here, Soufflé refers to the Soufflé engine with auto-selection enabled. The experiments demonstrate that Soufflë has a considerable run-time improvement over the other engines with a speedup of approx. 42 over Bddbddb, respectively.

Figure 6:
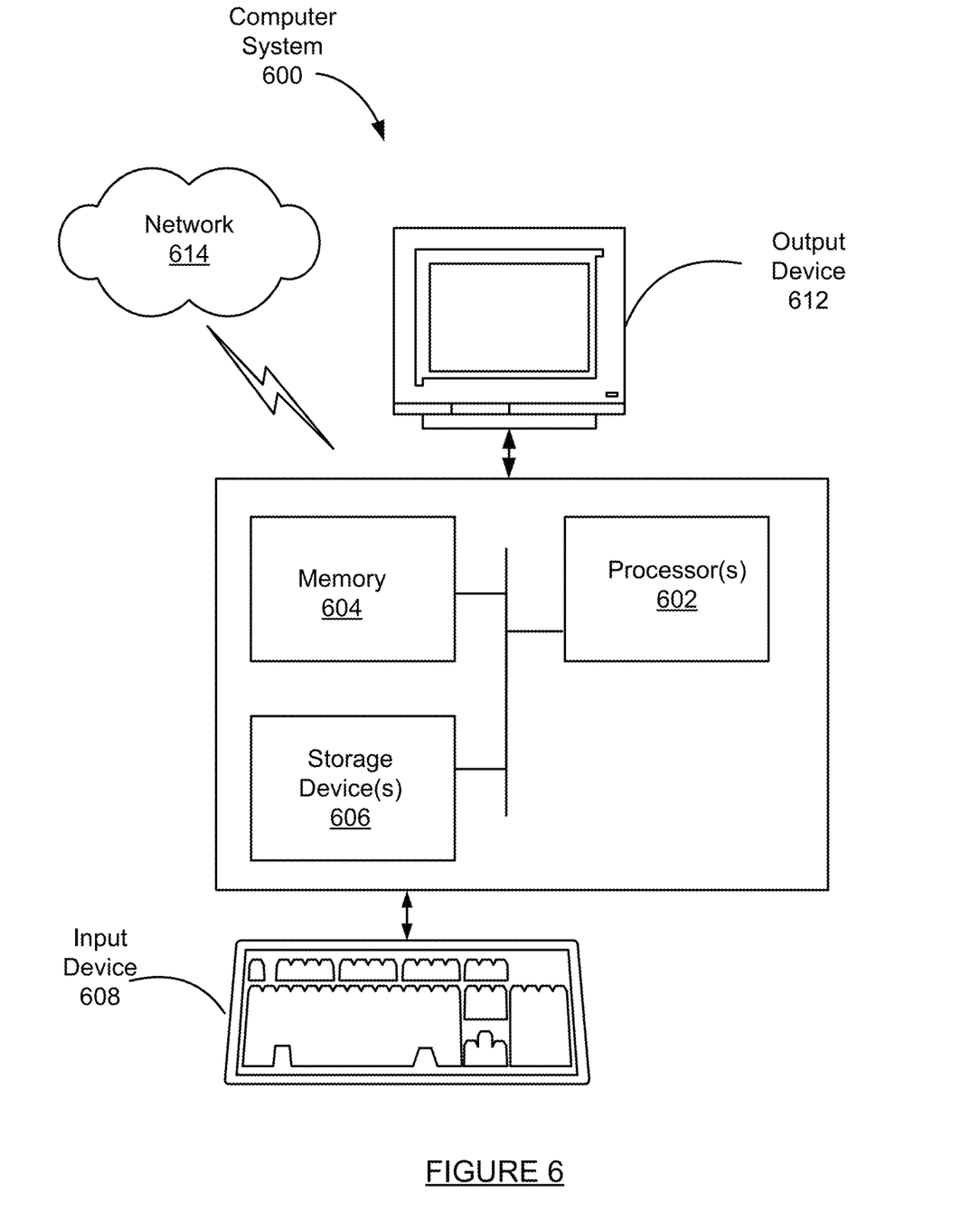
FIG. 6 shows a computer system in accordance with one or more embodiments of the invention.

One or more embodiments of the invention may be implemented on virtually any type of computer regardless of the platform being used. For example, as shown in FIG. 6, a computer system (600) includes one or more processor(s)

(602), associated memory (604), one or more storage device(s) (406), and numerous other elements and functionalities typical of today's computers (not shown). The computer (600) may also include one or more input devices (608), and output devices (612). The computer system (600) is connected to a LAN or a WAN (e.g., the Internet) (614) via a network interface connection. Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., data repository, static analysis engine, static program analysis tool, statement modifier, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method for performing analysis using a minimal set of indices for an input query comprising:
   identifying the input query comprising a plurality of primitive searches that are accelerated using indices;
   computing a minimal set of indices for the input query using a polynomial-time algorithm by constructing a bi-partite graph comprising a first and a second vertex set, wherein the first and the second vertex set are a set of searches in both partitions of the bi-partite graph;
   identifying an edge set as a strict subset relation between at least two searches of the set of searches showing up in the first and second vertex set of the bi-partite graph, wherein each edge of the edge set connects a vertex in the first vertex set and a vertex in the second vertex set; and
   performing relational data analysis using the minimal set of indices for input queries.

2. The method of claim 1, wherein computing the minimal set of indices for the input query further comprises:
   computing a matching set comprising at most one edge in a matching set for each vertex within the bi-partite graph; and
   traversing the matching set to find one or more chains and convert the one or more chains to lexicographical orders.

3. The method of claim 1, wherein the plurality of primitive searches comprises, as a search predicate, a conjunction of equalities over attributes.

4. The method of claim 1, further comprising:
   constructing value queries and equi-joins using the plurality of primitive searches.

5. The method of claim 1, wherein the relational data analysis is performed on an in-memory Datalog machine.

6. A system for performing analysis using a minimal set of indices for an input query comprising:
   a data repository storing software code; and
   a computer processor communicatively connected to the data repository and configured to execute instructions to:
      identify the input query comprising a plurality of primitive searches that are accelerated using indices,
      compute a minimal set of indices for the input query using a polynomial-time algorithm by constructing a bi-partite graph comprising a first and a second vertex set, wherein the first and the second vertex set are a set of searches in both partitions of the bi-partite graph,
      identify an edge set as a strict subset relation between at least two searches of the set of searches showing up in the first and second vertex set of the bi-partite graph, wherein each edge of the edge set connects a vertex in the first vertex set and a vertex in the second vertex set, and
      perform relational data analysis using the minimal set of indices for input queries.

7. The system of claim 6, wherein the computer processor is further configured to execute instructions to compute the minimal set of indices for the input query by:
   computing a matching set comprising at most one edge in a matching set for each vertex within the bi-partite graph; and
   traversing the matching set to find one or more chains and convert the one or more chains to lexicographical orders.

8. The system of claim 6, wherein the plurality of primitive searches comprises, as a search predicate, a conjunction of equalities over attributes.

9. The system of claim 6, wherein the computer processor is further configured to execute instructions to construct value queries and equi-joins using the plurality of primitive searches.

10. The system of claim 6, further comprising:
    an in-memory Datalog machine to perform the relational data analysis.

11. A non-transitory computer readable medium comprising instructions that, when executed by a computer processor, perform a method for performing analysis using a minimal set of indices for an input query comprising:
    identifying the input query comprising a plurality of primitive searches that are accelerated using indices;
    computing a minimal set of indices for the input query using a polynomial-time algorithm by constructing a bi-partite graph comprising a first and a second vertex set, wherein the first and the second vertex set are a set of searches in both partitions of the bi-partite graph;
    identifying an edge set as a strict subset relation between at least two searches of the set of searches showing up in the first and second vertex set of the bi-partite graph, wherein each edge of the edge set connects a vertex in the first vertex set and a vertex in the second vertex set; and
    performing relational data analysis using the minimal set of indices for input queries.

12. The non-transitory computer readable medium of claim 11, wherein the computer processor is further configured to execute instructions to compute the minimal set of indices for the input query by:

computing a matching set comprising at most one edge in a matching set for each vertex within the bi-partite graph; and traversing the matching set to find one or more chains and convert the one or more chains to lexicographical orders.

13. The non-transitory computer readable medium of claim 11, wherein the plurality of primitive searches comprises, as a search predicate, a conjunction of equalities over attributes.

14. The non-transitory computer readable medium of claim 11, further comprising instructions that, when executed by a computer processor, perform the method for performing analysis using a minimal set of indices for an input query comprising:

constructing value queries and equi-joins using the plurality of primitive searches.

15. The non-transitory computer readable medium of claim 11, wherein the relational data analysis is performed on an in-memory Datalog machine.

\* \* \* \* \*